United States Patent
Ise et al.

(10) Patent No.: US 6,240,361 B1
(45) Date of Patent: May 29, 2001

(54) NAVIGATION APPARATUS

(75) Inventors: Masato Ise; John P. McGovern, both of Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/138,424

(22) Filed: Aug. 6, 1998

(30) Foreign Application Priority Data

Aug. 8, 1997 (JP) .................................................... 9-227485
Aug. 28, 1997 (JP) .................................................... 9-247710

(51) Int. Cl.[7] .................................................... G01C 21/30
(52) U.S. Cl. ..................... 701/208; 701/212; 340/995
(58) Field of Search ..................... 701/201, 208, 701/211, 212; 340/990, 995

(56) References Cited

U.S. PATENT DOCUMENTS

| | | | |
|---|---|---|---|
| 5,272,638 | * 12/1993 | Martin et al. | 701/200 |
| 5,471,392 | * 11/1995 | Yamashita | 701/200 |
| 5,587,911 | * 12/1996 | Asano et al. | 701/202 |
| 5,617,319 | 4/1997 | Arakawa et al. | 701/207 |
| 5,635,953 | * 6/1997 | Hayami et al. | 345/146 |
| 5,699,255 | * 12/1997 | Ellis et al. | 701/212 |
| 5,842,147 | * 11/1998 | Nimura et al. | 701/211 |
| 5,884,219 | * 3/1999 | Curtwright et al. | 701/213 |
| 5,941,930 | * 8/1999 | Morimoto et al. | 701/201 |
| 6,016,110 | * 1/2000 | Takinami | 340/995 |

* cited by examiner

Primary Examiner—Tan Nguyen
(74) Attorney, Agent, or Firm—Brinks Hofer Gilson & Lione

(57) ABSTRACT

A navigation apparatus includes a display unit for displaying a map and a cursor, and a scrolling unit for scrolling the map displayed on the display unit. The navigation apparatus also has a place-name-display control unit for displaying on the display unit, when scrolling is performed, the place name corresponding to the position of the cursor on the map displayed on the display unit.

33 Claims, 7 Drawing Sheets

FIG. 2 (1)
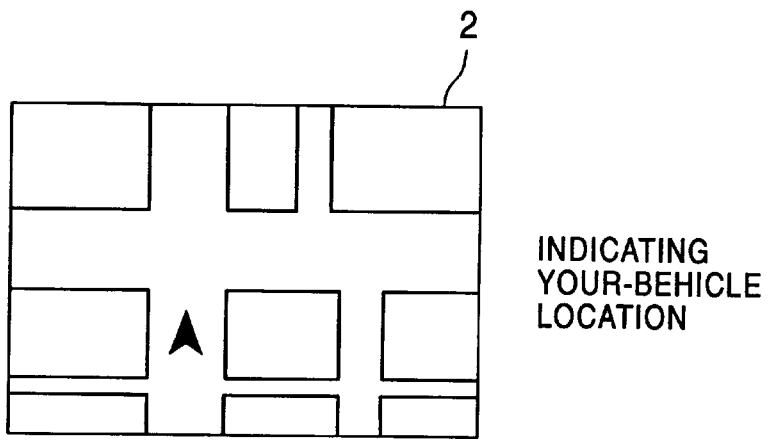
INDICATING YOUR-BEHICLE LOCATION
FIG. 2 (2)
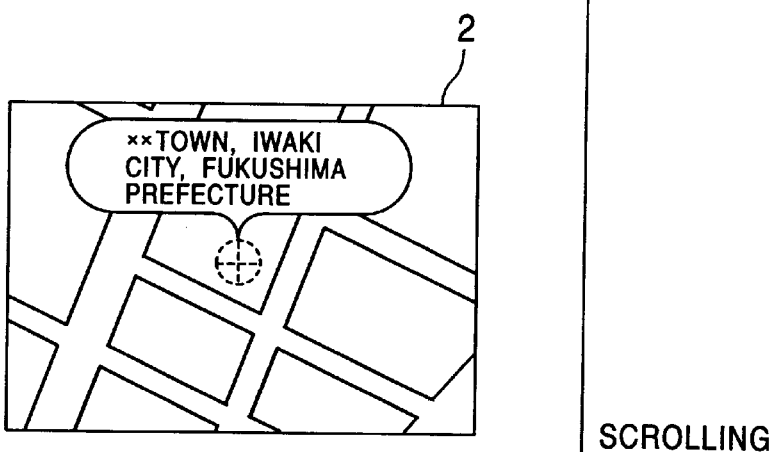
SCROLLING
FIG. 2 (3)
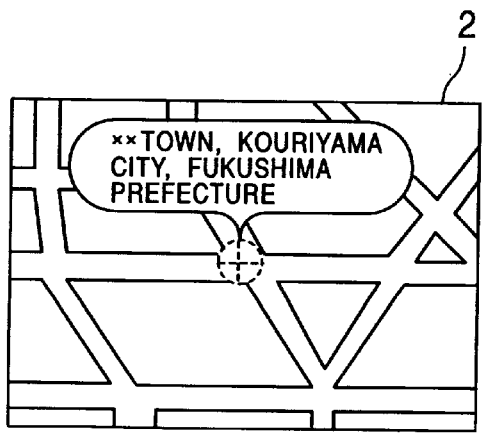

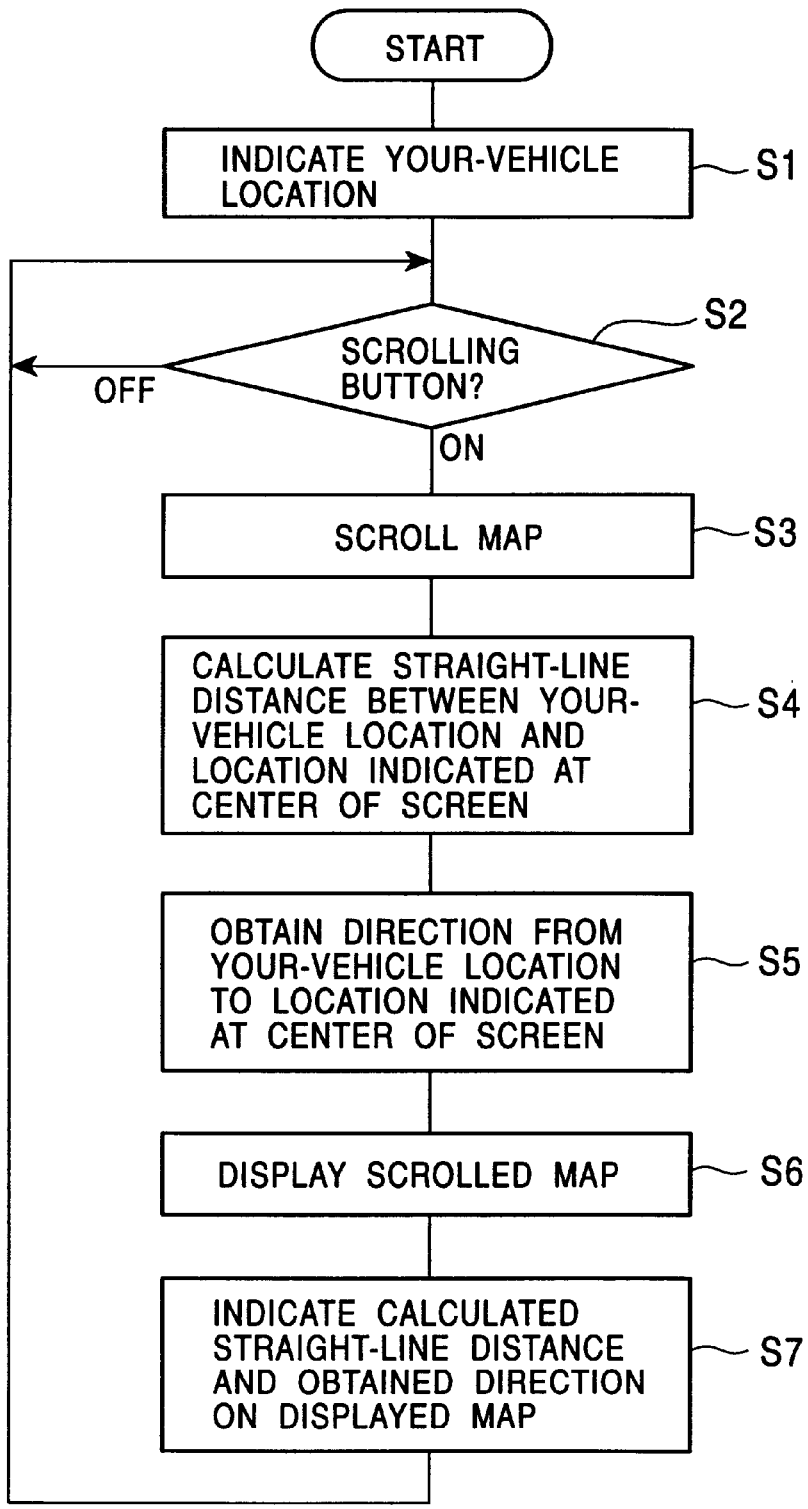

NAVIGATION APPARATUS

BACKGROUND OF THE INVENTION

1. Field of the Invention

The present invention relates to a navigation apparatus in which a map and a cursor are displayed on display means and the map displayed on the display means is scrolled.

2. Description of the Related Art

FIG. 7 illustrates the operation for setting the destination in a conventional navigation apparatus.

The mark of an operator's vehicle location and a map in the vicinity of the location where the operator's vehicle is positioned are displayed on a display unit (display) (S31). To indicate the destination on the display unit, a joystick is leaned in a direction in which the map is to be scrolled and the map on the display unit is scrolled (S32). During scrolling, when the destination is indicated on the display unit and it is shown at the cursor, the joystick is pressed (a destination-decision button is pressed) (S33) to set the destination and to indicate information related to the set destination on the display unit (S34). For example, information such as the address of the destination and a facility name at the destination is indicated.

If scrolling is not continued, the address and the facility name are indicated. When scrolling is continued (S35), the address and the facility name being indicated are deleted (S36), and scrolling is performed (S32). During scrolling, when a new destination is indicated on the display unit and it is shown at the cursor, the joystick is pressed (the destination-decision button is pressed) (S33) to set the destination again and to indicate information related to the set destination, such as the address of the set destination and a facility name at the destination, on the display unit (S34).

As described above, the map is scrolled and when the cursor on the display unit is positioned on the destination, the destination-decision button is pressed. The destination setting operation is completed and the address of the destination and a facility name at the destination are indicated. It can be confirmed that the set destination is the desired one.

In the above conventional apparatus, the address or the facility name cannot be indicated unless a destination setting operation is performed. To obtain information as to a new place other than the set destination, such as the address thereof and a facility name at the place, it is necessary to perform the same destination setting operation. In other words, the map is scrolled so that the new place is indicated at the cursor (S35, S36, S32), and when the new place is indicated at the cursor, the destination-decision button needs to be pressed (S33). A troublesome operation of pressing the destination-decision button is required to indicate the address of the destination and a facility name at the destination.

When a place other than the destination is displayed on the display unit, if the displayed place is strange to an operator, the operator cannot identify the place. In this case, the operator cannot know which place is being displayed unless the destination-decision button is pressed.

When the map displayed on the display unit is scrolled to show a place other than that in which the operator's vehicle is included, if the operator does not know the location of the map which is currently displayed, the operator cannot recognize the relationship between the location of the map being displayed and the operator's vehicle location.

SUMMARY OF THE INVENTION

Accordingly, an object of the present invention is to provide a navigation apparatus which can indicate the address of or a facility name at the location displayed at the cursor when the map is scrolled, without performing a troublesome operation such as pressing a destination-decision button.

Another object of the present invention is to provide a navigation apparatus which allows the operator to easily recognize the relationship between the location of the map currently being displayed and the operator's vehicle location when the map displayed on a display unit is scrolled to show a map other than that in which the operator's vehicle location is included.

One of the foregoing objects is achieved in one aspect of the present invention through the provision of a navigation apparatus including: display means for displaying a map and a cursor; scrolling means for scrolling the map displayed on the display means; and place name-display control means for displaying on the display means the place name corresponding to the position of the cursor on the map displayed on the display means, when scrolling is performed.

According to the present invention, when a map is scrolled, the address of and a facility name at the location corresponding to the cursor can be displayed without performing a troublesome operation, such as pressing a destination-decision button.

One of the foregoing objects is achieved in another aspect of the present invention through the provision of a navigation apparatus including: display means for displaying a map and a cursor; scrolling means for scrolling the map displayed on the display means; and direction-display control means for displaying on the display means the direction viewed from the operator's vehicle location or the specified location to the location corresponding to the cursor displayed on the display means.

According to the present invention, when the map displayed on the display unit is scrolled to show a map which does not include the operator's vehicle location, the operator can easily recognize the relationship between the currently displayed map and the operator's vehicle location.

One of the foregoing objects is achieved in still another aspects of the present invention through the provision of a navigation apparatus including: display means for displaying a map and a cursor; place-name-display control means for displaying on the display means the place name of the location on the map corresponding to the cursor displayed on the display means; and display-place-name changing means for changing the place name of the location on the map corresponding to the cursor according to the scale of the map displayed on the display means.

According to the present invention, the place name of the location on a map corresponding to the cursor can be appropriately displayed as a country name, a prefecture name, a city or town name, or a house number according to the scale of the map displayed on the display means.

One of the foregoing objects is achieved in yet another aspect of the present invention through the provision of a navigation apparatus including: display means for displaying a map and a cursor; scrolling means for scrolling the map displayed on the display means; a database in which a location on the map corresponds to its name; and display control means for displaying on the display means, when a specified time period elapses after the map displayed on the display means is scrolled and scrolling is stopped, the name of the location corresponding to the cursor on the map displayed on the display means.

According to the present invention, when a map is scrolled, a facility name at the location corresponding to the cursor can be displayed without performing a troublesome operation, such as pressing a destination-decision button.

One of the foregoing objects is achieved in a further aspect of the present invention through the provision of a navigation apparatus including: display means for displaying a map and a cursor; a database in which a location on the map corresponds to its river name, its sea name, its mountain name, or its lake name; and display control means for displaying on the display means the river name, the sea name, the mountain name, or the lake name of the location corresponding to the cursor on the map displayed on the display means.

According to the present invention, it is easier to identify a displayed location than when only an address is indicated.

BRIEF DESCRIPTION OF THE DRAWINGS

FIGS. 2(1)–2(3) illustrate the operation in a first embodiment.

FIG. 3 is a flowchart indicating the operation in a second embodiment.

Figure 1:
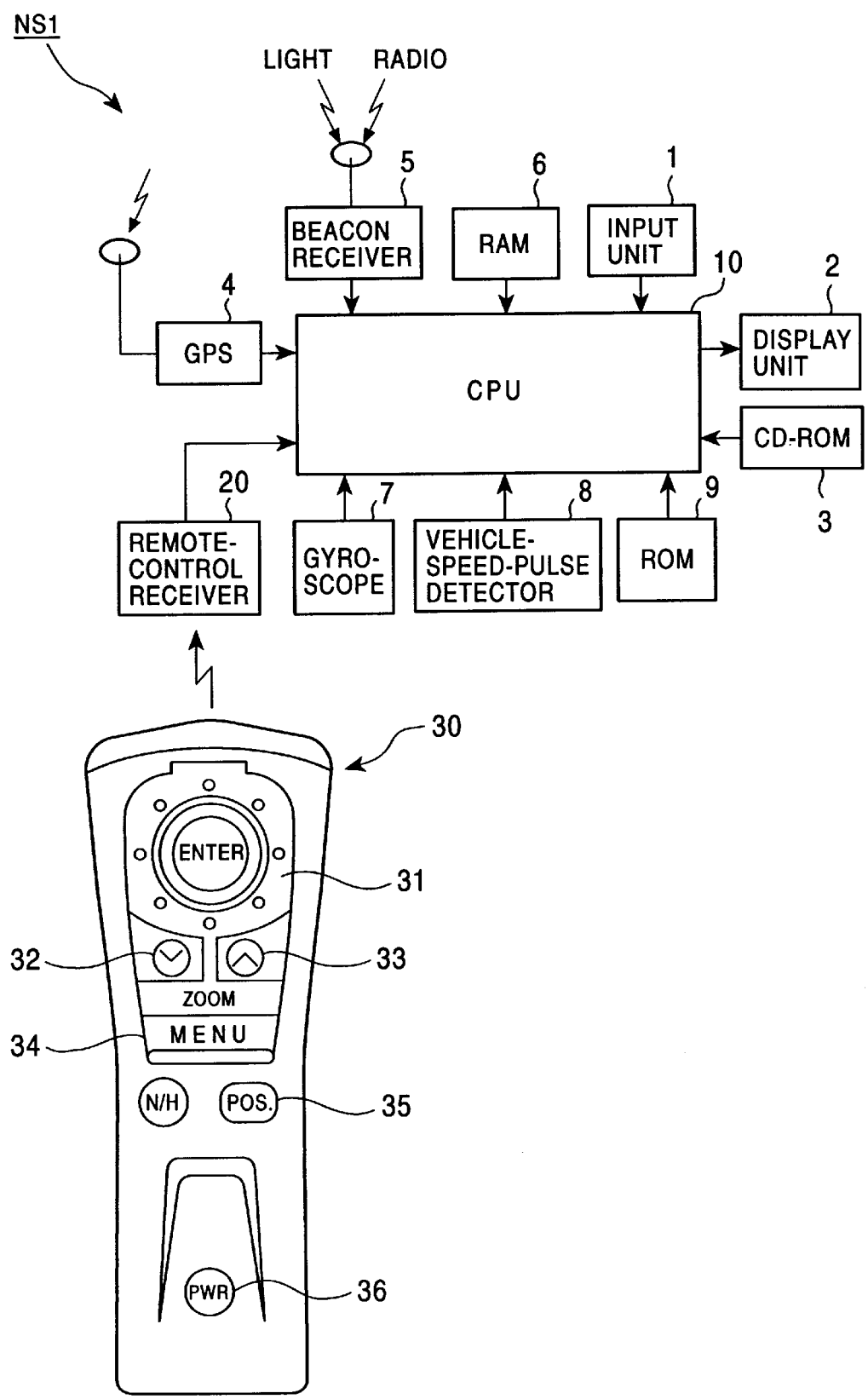
FIG. 1 is a block diagram of a navigation apparatus NS1 according to the present invention.

DESCRIPTION OF THE PREFERRED EMBODIMENTS (A) First Embodiment
(a) Configuration of Navigation Apparatus FIG. 1 is a block diagram of a navigation apparatus NS1 according to the present invention.

The navigation apparatus NS1 includes an input unit 1, a display unit 2, a CD-ROM 3, a GPS receiver 4, a beacon receiver 5, a RAM 6, a gyroscope 7, a vehicle-speed-pulse detector 8, a ROM 9, a CPU 10, a remote-control receiver 20, and a remote controller 30.

The CPU 10 displays a map in the vicinity of the current location of a vehicle, a guided path from the starting point to the destination, a mark of the operator's vehicle location, a cursor, and other pieces of guide information on the display unit 2.

The input unit 1 serves as a means for inputting the destination. The display unit 2 is formed of a liquid crystal display and shows a map, the cursor, a guided path, and various menus. The CD-ROM 3 is a memory which stores map data formed of a road layer, a background layer, a character and symbol layer for each scale, and serves as a database in which a location on a map corresponds to its place name. Place names indicated on the display means include country name, a prefecture name, a city and town name, and house number.

The GPS receiver 4 detects the current location of the vehicle, the direction in which the vehicle travels, and the vehicle speed with the use of satellite navigation. The beacon receiver 5 receives light beacon or radio beacon output from a transmitter provided along a road. The light beacon and the radio beacon are used for sending traffic information within a small area and can supply relatively detailed traffic information. The RAM 6 is a memory for temporarily storing specified data. The gyroscope 7 detects the rotation angle of the vehicle. The vehicle-speed-pulse detector 8 detects a vehicle-speed pulse generated during the movement of the vehicle. The ROM 9 stores the programs corresponding to the flowcharts shown in FIGS. 3 and 5.

The remote controller 30 includes a joystick key 31, an enlargement key 32 for displaying a detailed-level map, a reduction key 33 for displaying a large-area map, a menu key 34 for displaying a menu, a position key 35 for displaying a map which includes the operator's vehicle location, together with the operators vehicle location mark, and a power key 36. The enlargement key 32 and the reduction key 33 serve as scale-changing means for changing the scale of a map displayed on the display means.

The joystick key 31 is depressed in order to move the cursor relative to the map in one of eight directions, to move a menu selection bar right and left or up and down to select the desired menu item, to input the location specified by the cursor on a map, or to select the menu.

The CPU 10 serves as a scrolling means for scrolling the map displayed on the display means. It also serves as place-name-display control means for showing on the display means the place name corresponding to the cursor position on the map displayed on the display means, when the map is scrolled. The CPU 10 yet also serves as display-place-name changing means for changing the place name to be displayed, according to the cursor position which changes as the map is scrolled.

Place-name-display Processing in the First Embodiment

FIGS. 2(1)–2(3) illustrate the operation in a first embodiment.

As shown in FIG. 2(1), a map around the operator's vehicle location and the mark of the operator's vehicle location are displayed on the display unit 2.

At this state, the map displayed on the display unit 2 is scrolled. With this scrolling, the map displayed on the display unit 2 changes, and the place name of the position on the map corresponding to the cursor position indicated at the center of the display unit 2 is shown. In this case, since the location on the map corresponding to the cursor position changes by scrolling, the place name corresponding to the cursor position also changes as the location on the map changes.

As shown in FIG. 2(2), the place name of the location on the map corresponding to the cursor position is, for example, xx town, Iwaki city, Fukushima prefecture at a point in time during scrolling. Scrolling continues and at a next point in time, the place name of the location on the map corresponding to the cursor position is changed to, for example, xx town, Kouriyama city, Fukushima prefecture as shown in FIG. 2(3). When scrolling continues further, the place name of the location on the map corresponding to the cursor position is changed again. This operation is repeated.

According to the first embodiment, even if a troublesome operation, such as pressing the destination-decision button, is not performed, the address of and a facility name at the location corresponding to the cursor position can be displayed just by scrolling. An operation for displaying a place name is very easy to perform.

(B) Second Embodiment
(a) Distance and Direction Display Processing in a Second Embodiment FIG. 3 is a flowchart indicating the operation of a second embodiment.

Figure 4:
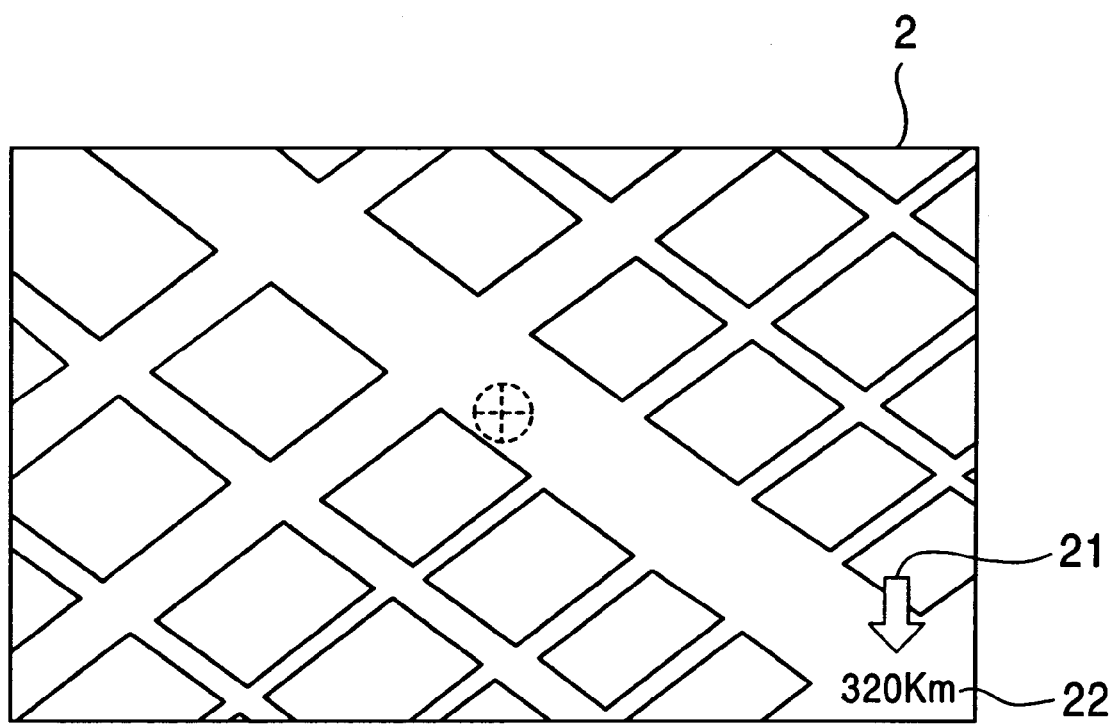
FIG. 4 is a view of a screen in a display unit 2 in an operation performed according to the flowchart shown in FIG. 3.

FIG. 4 is a view of a screen in the display unit 2 in an operation performed according to the flowchart shown in FIG. 3.

A map around the operator's vehicle location is displayed on the display unit 2. When a scrolling button is pressed (S2), scrolling starts (S3). The distance in a straight line between the operator's vehicle location and the location corresponding to the cursor displayed at the screen center of the display unit 2 is calculated (S4). The direction from the operator's vehicle location to the location corresponding to the cursor displayed at the screen center of the display unit 2 is also obtained (S5).

The scrolled map is displayed on the display unit 2(S6). Along with this map, the calculated straight-line distance and the obtained direction are displayed on the display unit (S7). FIG. 4 shows a screen example. The calculated distance is indicated, for example, at the bottom right of the display unit 2 as a distance indication 22 of, for example, 320 km. The obtained direction is indicated, for example, at the bottom right of the display unit 2 by a downward arrow 21.

According to the second embodiment, when the map displayed on the display unit is scrolled to show a map which does not include the operator's vehicle location, the operator can easily recognize the relationship between the currently displayed map and the operator's vehicle location.

In FIG. 4, the arrow 21 indicates the downward direction. Therefore, the location corresponding to the cursor displayed at the screen center of the display unit 2 is at the south when viewed from the operator's vehicle location. To indicate a direction, a character, such as "South," "East," and "Northwest," may be used instead of the arrow in the second embodiment. A symbol or character indicating a direction and numerals indicating a straight-line distance may be shown at a position other than the right bottom of the display unit 2.

In the second embodiment, the direction from the operator's vehicle location to the position currently displayed is indicated on the display means. Instead of the operator's vehicle location, a specified location may be used. In this case, the direction from the specified location to the currently displayed position is indicated on the display means. Also in the second embodiment, the straight-line distance between the operator's vehicle location to the currently displayed position is indicated on the display means. Instead of the operator's vehicle location, a specified location may be used. In this case, the straight-line distance between the specified location to the currently displayed position is indicated on the display means.

In other words, the CPU 10 serves as direction-display control means for displaying on the display means the direction viewed from the operator's vehicle location or the specified location to the currently displayed position. The CPU 10 also serves as straight-line-distance-display control means for displaying on the display means the straight-line distance from the operator's vehicle location or the specified location to the currently displayed position.

(C) Third Embodiment (a) Place-name-display Processing in a Third Embodiment

Figure 5:
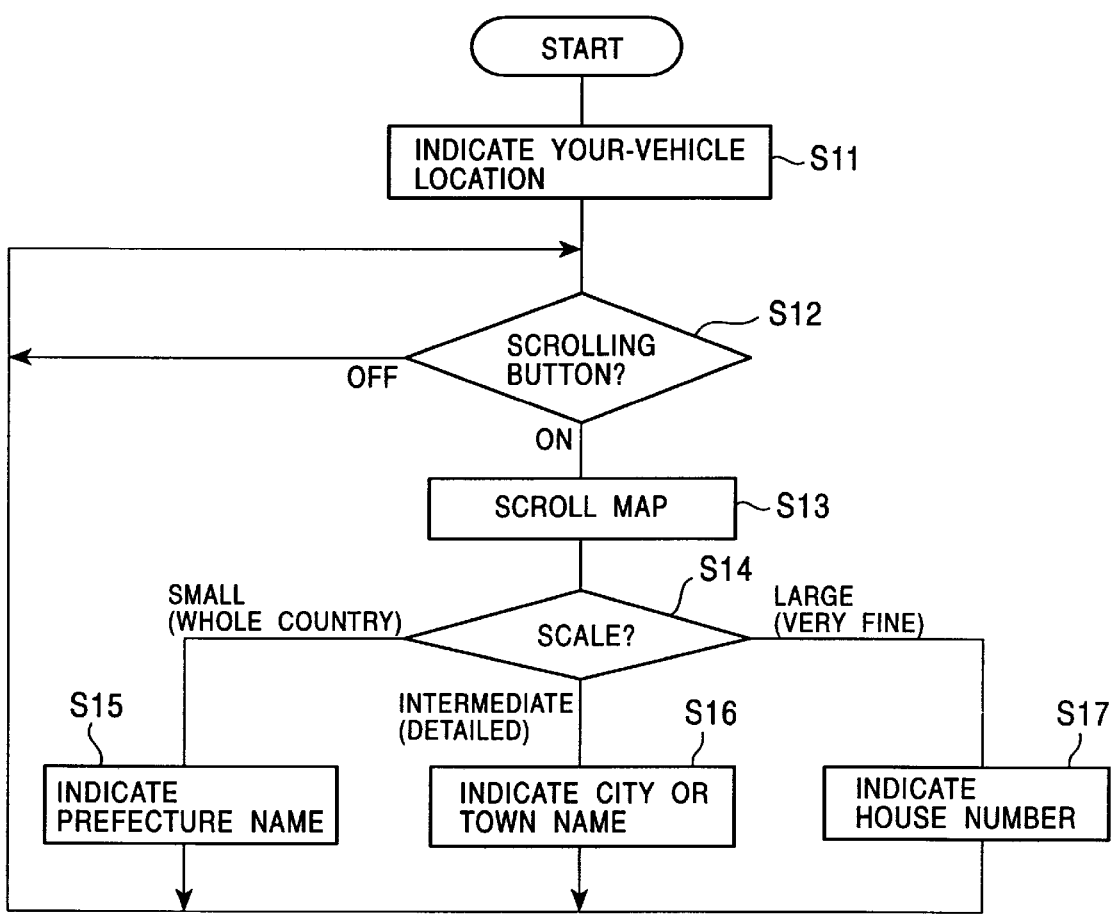
FIG. 5 is a flowchart indicating the operation in a third embodiment.

FIG. 5 is a flowchart indicating the operation in a third embodiment.

The location of the operator's vehicle is indicated (S11). When the scrolling button is switched on (S12), scrolling starts (S13) and the scale of the map currently displayed on the display unit 2 is checked (S14). When the scale is small, the name of the prefecture or the state which includes the location on the map corresponding to the cursor displayed at the center of the display unit 2 is indicated (S15). When the scale is intermediate, the name of the city or town which includes the location on the map corresponding to the cursor displayed at the center of the display unit 2 is indicated (S16). When the scale is large, the house number at the location on the map corresponding to the cursor displayed at the center of the display unit 2 is indicated (S17).

According to the third embodiment, the place name of the location on the map corresponding to the cursor is indicated appropriately as a country name, a prefecture name, a city or town name, or a house number, according to the scale of the map displayed on the display means.

In other words, the CPU 10 serves as place-name-display control means for displaying on the display means the place name of the location on the map corresponding to the cursor displayed on the display means. The CPU 10 also serves as display-place-name changing means for changing the place name of the location on the map corresponding to the cursor according to the scale of the map displayed on the display means. In this case, the display-place-name changing means changes one of a country name, a prefecture name, a city or town name, and a house number to another according to the scale of the map displayed on the display means.

Whether the scale is large, intermediate, or small may be determined in any way in the third embodiment. You may consider that a whole-country map is displayed if the scale is small, a detailed map is displayed if the scale is intermediate, a very fine map is displayed if the scale is large. It may be configured such that a country name is indicated in Europe if the scale is small.

(D) Fourth Embodiment (a) Outline of Fourth Embodiment

In FIG. 1, the CD-ROM 3 is a memory which stores map data formed of a road layer, a background layer, and a character and symbol layer for each scale, and serves as a database in which a location on a map corresponds to its name. The name indicated on display means includes at least one of an address, a place name, a facility name, a river name, a road name, a sea name, a mountain name, and a lake name.

Figure 6:
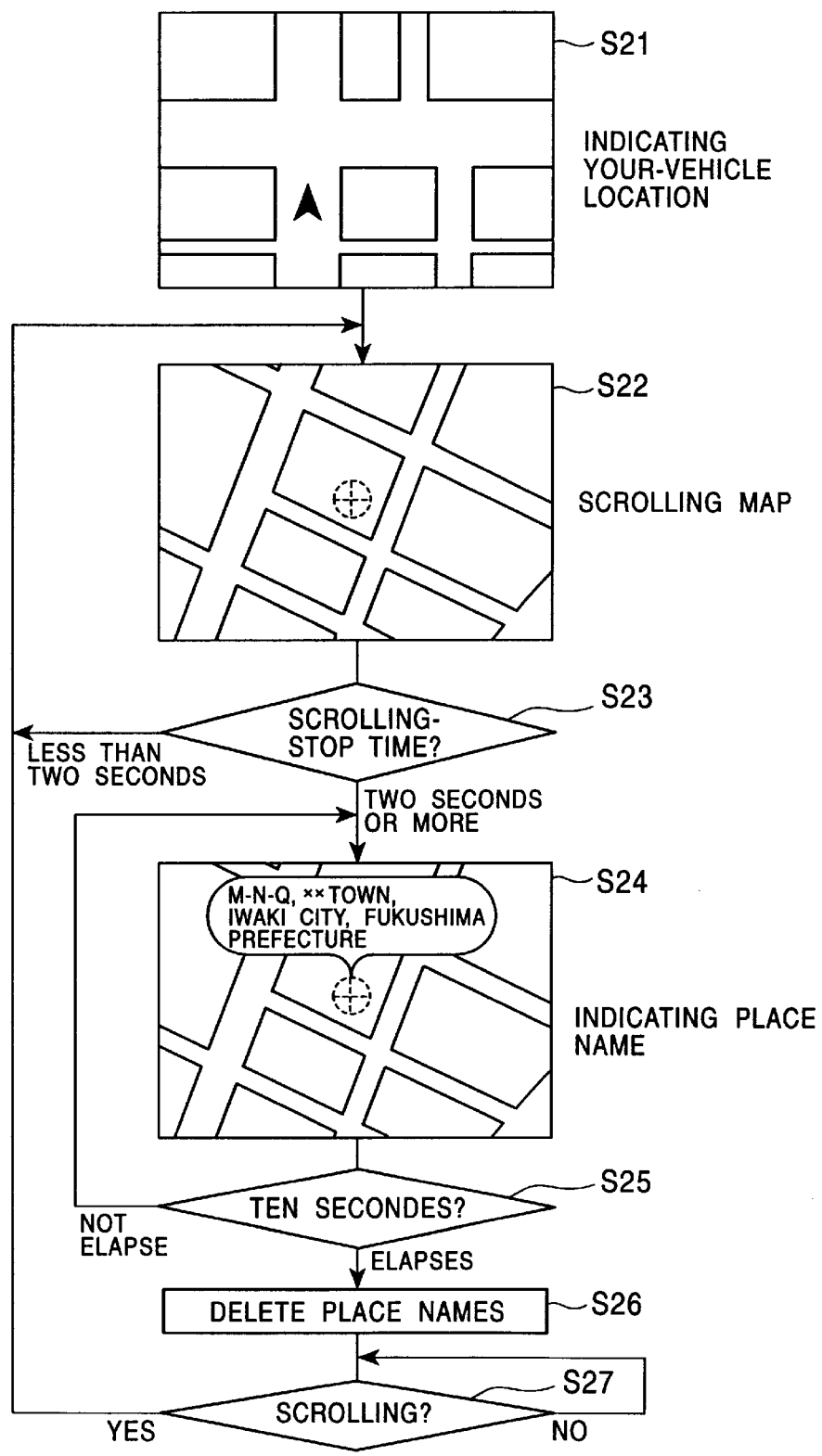
FIG. 6 is a flowchart indicating an operation in a fourth embodiment.
Figure 7:
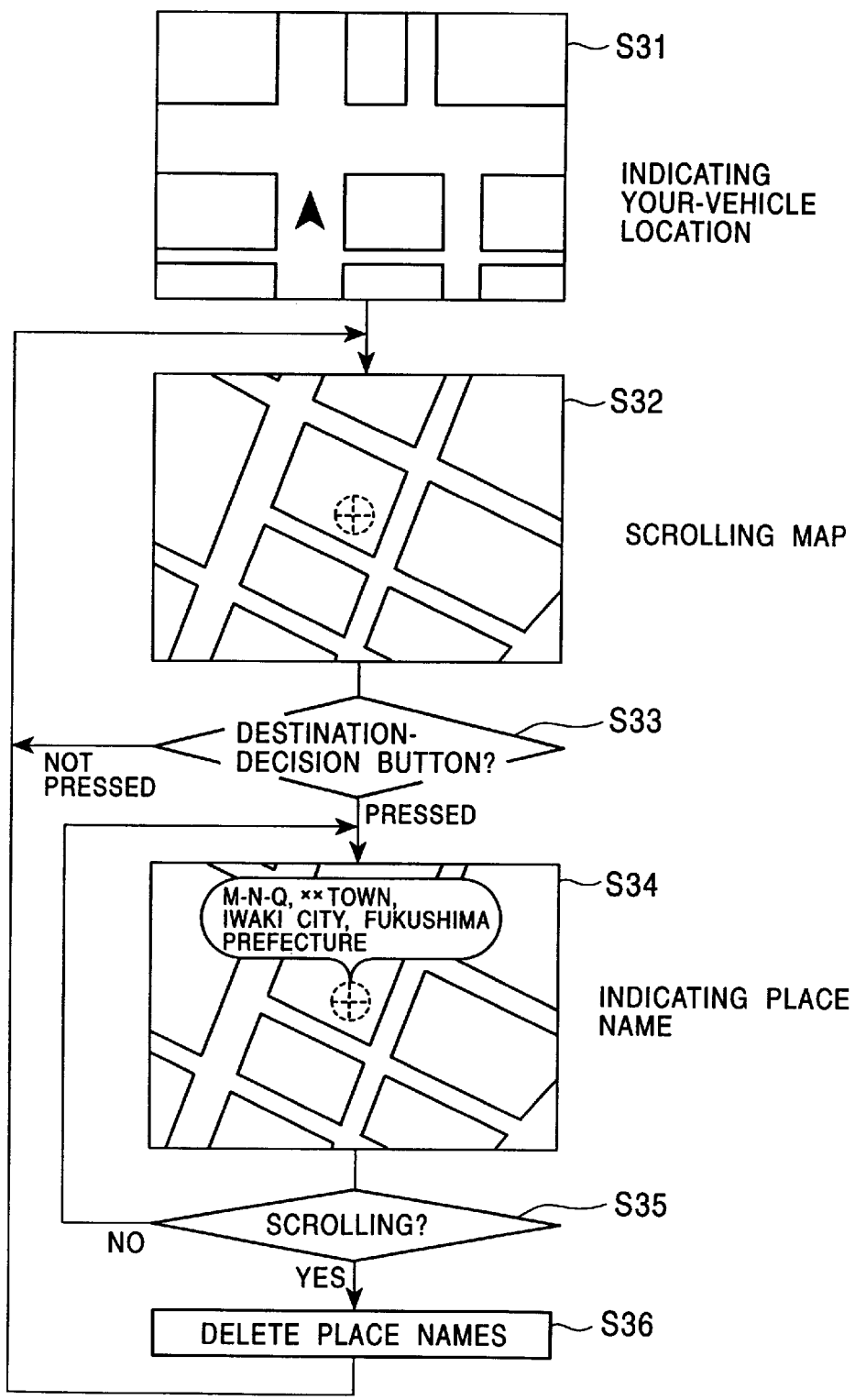
FIG. 7 is a view showing the operation for setting the destination in a conventional navigation apparatus.

The ROM 9 stores the program corresponding to the flowchart shown in FIG. 6.

The CPU 10 serves as a scrolling means for scrolling the map displayed on the display means. It also serves as display control means for displaying on the display means, when a specified time period elapses after the map displayed on the display means is scrolled and scrolling is stopped, the name of the location corresponding to the cursor on the map displayed on the display means.

The display control means displays the name to be displayed after the specified time period, only for a second specified time period.

(b) Name-display Processing in the Fourth Embodiment

FIG. 6 is a flowchart indicating the operation in the fourth embodiment.

A mark of the operator's vehicle and a map in the vicinity of the location where the operator's vehicle is positioned are displayed on a display unit (display) 2 (S21). To indicate the destination on the display unit 2, a joystick (provided for the input unit 1) is leaned in a direction in which the map is to be scrolled, and the map on the display unit 2 is scrolled (S22). During scrolling, when the destination is shown on the display unit 2, the operator releases the joystick to stop scrolling. When a specified time period (for example, two seconds) elapses after scrolling is stopped (S23), the name of the location corresponding to the cursor on the map displayed on the display unit 2 is shown (S24). The name displayed on the display unit 2 can include an address, a place name, a facility name, a river name, a road name, a sea name, a mountain name, or a lake name at each location on the map.

When a second specified time period (for example, 10 seconds) elapses after the name is displayed on the display unit 2 (S25), the name is deleted (S26). If scrolling is not specified (S27), the current condition is maintained. When scrolling is specified (S27), the map is scrolled (S22). During scrolling, when a destination is indicated on the display unit 2, the operator releases the joystick to stop scrolling. When the specified time period (for example, two seconds) elapses after scrolling is stopped (S23), the name of the location corresponding to the cursor on the map displayed on the display unit 2 is shown (S24). The name remains indicated on the display unit 2, for example, for 10 seconds (S25).

According to the fourth embodiment, even if a troublesome operation, such as pressing a destination-decision button, is not performed, because a facility name at the location corresponding to the cursor on a map displayed on the display unit 2 can be shown when the map is scrolled, the displayed location can be easily identified.

In the fourth embodiment, the navigation apparatus includes display means for displaying a map and a cursor; a database in which a location on the map corresponds to its river name, its sea name, its mountain name, or its lake name; and display control means for displaying on the display means the river name, the sea name, the mountain name, or the lake name of the location corresponding to the cursor on the map displayed on the display means. When the river name, the sea name, the mountain name, or the lake name of the location corresponding to the cursor on the map is indicated as described above, it is easier to identify the displayed location than when only a road name and an address are indicated.

What is claimed is:

1. A navigation apparatus comprising:
    display means for displaying a map and a cursor;
    scrolling means for scrolling the map displayed on said display means; and
    place-name-display control means for displaying on said display means the place name corresponding to the position of the cursor on the map displayed on said display means, when a specified time period elapses after the map displayed on said display means is scrolled and scrolling is stopped.

2. A navigation apparatus according to claim 1, further comprising display-place-name changing means for changing the place name to be displayed, according to the cursor position changed by scrolling.

3. A navigation apparatus according to claim 1, wherein the place name displayed on said display means includes a facility name.

4. A navigation apparatus according to claim 1, wherein the cursor displayed on said display means is always shown substantially at the center of a screen when the map is scrolled.

5. A navigation apparatus comprising:
    display means for displaying a map and a cursor;
    scrolling means for scrolling the map displayed on said display means; and
    direction-display control means for displaying on said display means the direction viewed from a chosen position of either the operator's vehicle location or a specified location to the location corresponding to the cursor displayed on said display means, at least when the displayed map does not include the chosen position.

6. A navigation apparatus according to claim 5, wherein the direction shown on said display means is indicated by an arrow.

7. A navigation apparatus according to claim 5, wherein the direction shown on said display means is indicated by a character.

8. A navigation apparatus according to claim 5, further comprising straight-line-distance-display control means for displaying on said display means the straight-line distance between a chosen position of either the operator's vehicle location or the specified location and the currently displayed location.

9. A navigation apparatus according to claim 5, wherein the cursor displayed on said display means is always shown substantially at the center of a screen when the map is scrolled.

10. A navigation apparatus comprising:
    display means for displaying a map and a cursor;
    scrolling means for scrolling the map displayed on said display means;
    place-name-display control means for displaying on said display means the place name of the location on the map corresponding to the cursor displayed on said display means, when a specified time period elapses after the map displayed on said display means is scrolled and scrolling is stopped; and
    display-place-name changing means for changing the place name of the location on the map corresponding to the cursor according to the scale of the map displayed on said display means.

11. A navigation apparatus according to claim 10, wherein said display-place-name changing means changes one of a country name, a state name, a city or town name, and a house number to another according to the scale of the map displayed on said display means.

12. A navigation apparatus according to claim 10, wherein the scale of the map displayed on said display means is changed by external input means.

13. A navigation apparatus comprising:
    display means for displaying a map and a cursor;
    scrolling means for scrolling the map displayed on said display means;
    a database in which a location on the map corresponds to its name; and
    display control means for displaying on said display means, when a specified time period elapses after the map displayed on said display means is scrolled and scrolling is stopped, the name of the location corresponding to the cursor on the map displayed on said display means.

14. A navigation apparatus according to claim 13, wherein the name displayed on said display means is one of an address, a place name, a facility name, a river name, a road name, a sea name, a mountain name, and a lake name.

15. A navigation apparatus according to claim 13, wherein said display control means displays the name to be displayed after the specified time period elapses, only for a second specified time period.

16. A navigation apparatus according to claim 13, wherein said display control means does not display the name when scrolling is again performed within the specified time period.

17. A navigation apparatus according to claim 13, wherein the cursor displayed on said display means is always shown substantially at the center of a screen when the map is scrolled.

18. A navigation apparatus comprising:
    display means for displaying a map and a cursor;
    scrolling means for scrolling the map displayed on said display means;

a database in which a location on the map corresponds to its river name, its sea name, its mountain name, or its lake name; and display control means for displaying on said display means the river name, the sea name, the mountain name, or the lake name of the location corresponding to the cursor on the map displayed on said display means, when a specified time period elapses after the map displayed on said display means is scrolled and scrolling is stopped.

19. A navigation apparatus according to claim 18, further comprising:

display-name changing means for changing the name to be displayed, according to the cursor position changed by scrolling.

20. A navigation apparatus according to claim 18, wherein the cursor displayed on said display means is always shown substantially at the center of a screen when the map is scrolled.

21. A method of operating a vehicle navigation apparatus including a display, comprising:

displaying a map and a cursor on the display;

scrolling the map; and displaying an identification of the location on the map corresponding to the position of the cursor, when a specified time period elapses after the map displayed on said display is scrolled and scrolling is stopped.

22. A method of operating a vehicle navigation apparatus according to claim 21, wherein the displayed cursor is shown at a predetermined location on the display when the map is scrolled.

23. A method of operating a vehicle navigation apparatus according to claim 21, wherein the location identification is the name of the general geographic area corresponding to the position of the cursor.

24. A method of operating a vehicle navigation apparatus including a display, comprising;

displaying a map and a cursor on the display; and displaying the direction from a specified location to the location on the map corresponding to the cursor, at least when the displayed map does not include the specified location.

25. A method of operating a vehicle navigation apparatus according to claim 24, wherein the specified location is the vehicle location.

26. A method of operating a vehicle navigation apparatus according to claim 24, wherein the direction is indicated by an arrow.

27. A method of operating a vehicle navigation apparatus according to claim 24 wherein the direction is indicated by characters.

28. A method of operating a vehicle navigation apparatus according to claim 24 further comprising displaying the distance between a specified location and the location on the map corresponding to the cursor.

29. A method of operating a vehicle navigation apparatus according to claim 28 wherein the specified location is the vehicle location.

30. A method of operating a vehicle navigation apparatus including a display and at least a larger scale map and a smaller scale map, comprising:

displaying a map of a specified scale and a cursor on the display;

scrolling the map; and if the larger scale map is displayed, displaying a more specific identification of the location on the map corresponding to the position of the cursor, whereas it the smaller scale map is displayed, displaying a more general identification of the location on the map corresponding to the position of the cursor, where the identification is displayed after a specified time period elapses after the map displayed on the display is scrolled and scrolling is stopped.

31. A method of operating a vehicle navigation apparatus according to claim 30 including at least three maps, each map having a different scale ranging from smaller to larger, wherein the specificity of the identification of the location on a displayed map corresponding to the position of the cursor increases with increasing map scale.

32. A method of operating a vehicle navigation apparatus comprising:

displaying a map and a cursor on the display;

scrolling the map; and when a specified time period elapses after scrolling of the map is stopped, displaying an identification of the location on the map corresponding to the position of the cursor.

33. A method of operating a vehicle navigation apparatus according to claim 32, wherein the location identification is displayed for a second specified time period.

* * * * *